US009244178B2

(12) United States Patent
Jung et al.

(10) Patent No.: US 9,244,178 B2
(45) Date of Patent: Jan. 26, 2016

(54) METHOD FOR DETERMINING THE IRRADIATION DOSE DEPOSITED IN A SCINTILLATOR BY IONISING RADIATION AND ASSOCIATED DEVICE

(71) Applicants: CENTRE NATIONAL DE LA RECHERCHE SCIENTIFIQUE (C.N.R.S), Paris (FR); UNIVERSITE DE STRASBOURG, Strasbourg (FR)

(72) Inventors: Jean-Marc Jung, Gougenheim (FR); Till Sohier, Schiltigheim (FR); Mélodie Munier, Strasbourg (FR); Rémi Barillon, Marlenheim (FR); Mauricio Torres, Strasbourg (FR)

(73) Assignees: CENTRE NATIONAL DE LA RECHERCHE SCIENTIFIQUE (C.N.R.S), Paris (FR); UNIVERSITÉ DE STRASBOURG, Strasbourg (FR)

( * ) Notice: Subject to any disclaimer, the term of this patent is extended or adjusted under 35 U.S.C. 154(b) by 0 days.

(21) Appl. No.: 14/353,845

(22) PCT Filed: Oct. 24, 2012

(86) PCT No.: PCT/EP2012/071085
§ 371 (c)(1),
(2) Date: Apr. 24, 2014

(87) PCT Pub. No.: WO2013/060745
PCT Pub. Date: May 2, 2013

(65) Prior Publication Data
US 2014/0252238 A1    Sep. 11, 2014

(30) Foreign Application Priority Data

Oct. 24, 2011    (FR) ...................................... 11 59615

(51) Int. Cl.
*G01T 1/10*    (2006.01)
*G01T 1/02*    (2006.01)
*G01T 1/20*    (2006.01)

(52) U.S. Cl.
CPC ............... *G01T 1/023* (2013.01); *G01T 1/2006* (2013.01)

(58) Field of Classification Search
CPC .................................. G01T 1/02; G01T 1/026
USPC ......................................................... 250/362
See application file for complete search history.

(56) References Cited

U.S. PATENT DOCUMENTS 3,898,460 A * 8/1975 Noakes et al. ................ 250/328
6,479,829 B1 * 11/2002 Katagiri ..................... 250/484.5
(Continued)

FOREIGN PATENT DOCUMENTS

JP          5734474 A      2/1982
WO     2010017218 A2     2/2010

OTHER PUBLICATIONS

Sohier, "Nouvelle approche de la dosimétrie des rayonnements ionisants par mesure de fluorescence, selon la technique du comptage de photon unique, corrérlé en temps, à l'échelle nanoseconde", PhD Thesis, Mar. 9, 2012, pp. 1-125, <http://tel.archives-ouvertes.fr/docs/00/67/77/32/PDF/these.pdf>.
(Continued)

*Primary Examiner* — Kiho Kim
(74) *Attorney, Agent, or Firm* — Thompson Coburn LLP

(57) ABSTRACT

Method of determination of an irradiation dose deposited in a scintillator (5) by ionising radiation, comprising the steps of:
  irradiating the scintillator (5) during a predetermined time;
  detecting a moment of excitation of the scintillator (5) with a first photodetector (11); then
  detecting a moment of reception of a scintillation photon with a second photodetector (14), functioning in single photon counting mode;
  identifying each sequence consisting of the detection of a moment of excitation by the first photodetector (11), and the detection of a moment of reception by the second photodetector (14) with a coincidence event;
  counting the number of coincidence events;
  obtaining the irradiation dose deposited during the irradiation time as a function of the number of coincidence events counted and of a predetermined proportionality factor.

19 Claims, 10 Drawing Sheets

(56) References Cited

U.S. PATENT DOCUMENTS 7,479,639 B1 * 1/2009 Shahar et al. ............ 250/370.06
8,238,513 B2 * 8/2012 Ma ..................................... 378/6

OTHER PUBLICATIONS

Collomb-Patton et al, "The DOSIMAP, A High Spatial Resolution Tissue Equivalent 2D Dosimeter for LINAC QA and IMRT Verification", Medical Physics, Jan. 7, 2009, pp. 317-328, vol. 36, No. 2.

* cited by examiner

METHOD FOR DETERMINING THE IRRADIATION DOSE DEPOSITED IN A SCINTILLATOR BY IONISING RADIATION AND ASSOCIATED DEVICE

CROSS-REFERENCE TO RELATED APPLICATIONS

This application is a U.S. National Stage application of International Application No. PCT/EP2012/071085, filed on Oct. 24, 2012, which claims the benefit of French Application No. 1159615, filed on Oct. 24, 2011, both of which are incorporated herein by reference in their entireties.

The present invention relates to a method of determination of an irradiation dose deposited in a scintillator by ionising radiation.

In a large number of fields (medicine, pharmaceutical industry, agri-food industry, nuclear industry, liquid scintillation), it is important to be able to determine precisely the irradiation dose received by an object or a living organism subjected to ionising radiation.

The most widespread method for determination of the dose deposited in a material makes use of an ionisation chamber. The ionisation chamber comprises a compartment filled with a volume of gas. An anode and a cathode are disposed respectively at the ends of the compartment and an electrical potential difference is applied between the anode and the cathode in such a way as to create an electrical field in the gas. The ionising radiation incident in the ionisation chamber ionises the atoms or the molecules of the gas, thus creating pairs of charge carriers, electrons and holes. Under the effect of the electrical field existing in the gas, the positive carriers (ions) migrate towards the cathode, whilst the negative carriers (electrons) migrate towards the anode. The first, which are heavier and less mobile, are generally ignored. This results in an electrical current proportional to the number of pairs of charge carriers created in the gas by the ionising radiation. A correction taking account of the difference in density between the gas of the ionisation chamber and the material in which the deposited dose is to be estimated is then applied in such a way as to obtain the corrected dose in the material.

This method is not entirely satisfactory. In the first place, it is limited to the measurement of strong and average doses because of the difficulty of precisely measuring currents with an intensity below one picoampere. Consequently, the measurement of low doses, when it is possible, is marred by great uncertainties.

Moreover, the measured electrical current is proportional to the number of pairs of charge carriers created in the gas of the ionisation chamber. In order to obtain the dose deposited in the material, it is necessary to apply to the measurements from the ionisation chamber corrections which take account of the difference in density between the gas and the material. The application of such correction factors, sometimes incorporating geometric corrections, decreases the precision of the measurement.

Finally, the smallest ionisation chambers have sides measuring approximately 2 cm. They are therefore relatively bulky, which prevents them from being used in cramped locations.

A second method for determination of the dose deposited consists of using a scintillator associated with a photomultiplier tube. Under the effect of the incident ionising radiation, the scintillator is excited and emits light. This light results from two sources: i) the direct excitation of the scintillator, without ionisation, leading to a so-called prompt emission of light; ii) the ionisation of the scintillator and the production of pairs of charge carriers, according to a process similar to that induced in a conventional ionisation chamber, giving rise to a so-called recombination fluorescence, delayed with respect to the prompt fluorescence. The total light emitted by the scintillator is received by the photomultiplier tube, which converts it into an electrical signal. An electronic assembly placed downstream of the photomultiplier tube identifies that an excitation event is produced in the scintillator each time that the voltage at the outlet of the photomultiplier tube exceeds a predetermined trigger threshold. A table then gives the correspondence between the dose deposited in the material by the ionising radiation and the number of events counted by the photomultiplier.

The need for use of a table originates of the fact that the number of "excitation events" identified by the electronic assembly associated with the photomultiplier tube does not correspond to the number of excitation events actually produced in the scintillator, in particular because of noise intrinsic to the photomultiplier tube, as well as the Cherenkov radiation which can be produced in the scintillator following its stimulation, in the case of radiation having sufficient energy to produce it. Thus the table is a non-linear correspondence curve between the dose deposited in the material and the scintillation detected, the non-linearity resulting in particular from the increase in the noise of the detector with the intensity of the light received and the Cherenkov radiation.

Because of the need to use a non-linear correspondence curve in order to determine the dose from the scintillation detected, this method does not enable direct determination of the dose deposited in the material on the basis of the signal detected by the photomultiplier tube by means of a linear relationship between the dose deposited and the signal measured.

Furthermore, the table relates to a particular detector. In particular, the table is different for different models of photomultiplier, but likewise for two photomultipliers of the same model. The table varies if the photomultiplier is changed, even if a new model with the same reference is chosen.

An object of the invention is to provide a direct and precise method for determination of the irradiation dose deposited in a material by ionising radiation, even if this dose is very low.

To this end, the invention relates to a method of the aforementioned type comprising the steps of:
irradiating the scintillator by means of the ionising radiation for a predetermined time, each interaction between the ionising radiation and the scintillator exciting the scintillator and giving rise to the emission of scintillation photons;
detecting a moment of excitation of the scintillator by the ionising radiation using a first photodetector; then
detecting a moment of reception of a scintillation photon emitted by the scintillator using a second photodetector, functioning in single photon counting mode, separate from the first photodetector;
identifying each sequence consisting of the detection of a moment of excitation by the first photodetector, followed by the detection of a moment of reception by the second photodetector with a coincidence event;
counting the number of coincidence events detected during the predetermined irradiation time; and
obtaining the irradiation dose deposited in the scintillator during the predetermined irradiation time as a function of the number of coincidence events counted and of a predetermined proportionality factor.

According to particular embodiments, the method may comprise one or several of the following features, taken alone or according to any technically possible combination:
- the irradiation dose deposited in the scintillator during the predetermined irradiation time is obtained by multiplication of the number of coincidence events counted by the predetermined proportionality factor,
- the second photodetector has a physical aperture for receiving photons which has a smaller area than a physical aperture for receiving photons of the first photodetector,
- the first photodetector and the second photodetector are chosen from among a photomultiplier tube, a photomultiplier with a microchannel plate and a diode sensor,
- the predetermined proportionality factor is independent of the number of coincidence events detected,
- the method of determination comprises the steps of:
  - measuring the detection time between the moment of excitation detected by the first photodetector and the moment of reception of a scintillation photon by the second photodetector for each coincidence event;
  - constructing a curve of the number of coincidence events as a function of the detection time;
  - calculating the deposited dose based on an integration of at least one part of the curve and on the predetermined proportionality factor;
- the deposited dose is calculated by multiplying the integral of at least one part of the curve by the predetermined proportionality factor;
- the scintillator is an organic scintillator,
- the method comprises a step of transmission of at least a part of the light coming from the scintillator towards the first photodetector and the second photodetector by means of an optical fibre, and
- the method comprises a step consisting of placing the scintillator in a compartment for the application of the ionising radiation to a living organism.

The invention also relates to a method of determination of a curve giving the dose absorbed by a scintillator as a function of the distance between the scintillator and a source of ionising radiation, comprising the determination of the dose deposited at different distances from the source by carrying out, at each of these distances, the method of determination of the dose deposited as previously described.

The invention also relates to a device for the determination of the irradiation dose deposited in a scintillator by ionising radiation emitted by a source, comprising:
- a scintillator configured in order to be irradiated by the ionising radiation and adapted to emit scintillation photons at each interaction with the ionising radiation;
- a first photodetector configured in order to detect a moment of excitation of a scintillator, and a second photodetector, separate from the first photodetector, configured to operate in single photon counting mode and configured in order to detect a moment of reception of a scintillation photon emitted by the scintillator;
- identification means configured in order to identify each sequence consisting of the detection of a moment of excitation by the first photodetector, followed by the detection of a moment of reception of a scintillation photon by the second photodetector with a coincidence event;
- counting means configured in order to count the number of coincidence events detected during the predetermined irradiation time; and
- calculation means configured in order to obtain the irradiation dose deposited in the scintillator during the predetermined irradiation time as a function of the number of coincidence events and of a predetermined proportionality factor.

According to a particular feature of the device, the scintillator is integral with at least one optical fibre, which is adapted to transmit the scintillation photons emitted by the scintillator towards the first photodetector and the second photodetector.

According to a particular characteristic of the device:
- the identification means are further configured in order to measure the detection time between the moment of excitation detected by the first photodetector and the moment of reception of a scintillation photon by the second photodetector for each coincidence event; and
- the calculation means are further configured in order to construct a curve of the number of coincidence events as a function of the detection time and in order to calculate the deposited dose based on an integration of at least one part of the curve and on a predetermined proportionality factor.

The invention also relates to a method for determination of an ionisation dose deposited in a scintillator by ionising radiation comprising the steps of:
- irradiating the scintillator by means of the ionising radiation for a predetermined time, each interaction between the ionising radiation and the scintillator exciting the scintillator and giving rise to the emission of scintillation photons;
- detecting a moment of excitation of the scintillator by the ionising radiation using a first photodetector; then
- detecting a moment of reception of a scintillation photon emitted by the scintillator using a second photodetector, operating in single photon counting mode, separate from the first photodetector;
- identifying each sequence consisting of detection of a moment of excitation by the first photodetector, followed by detection of a moment of reception by the second photodetector with a coincidence event;
- measuring the detection time between the moment of excitation detected by the first photodetector and the moment of reception of a scintillation photon by the second photodetector for each coincidence event;
- constructing a curve of the number of coincidence events as a function of the detection time;
- calculating the integral of the curve of the number of coincidence events detected as a function of the detection time, between a detection time equal to $n \times \tau$ where n is a constant between 1 and 10, advantageously approximately equal to 1, and $\tau$ is the fluorescence lifetime of the scintillator, and a maximum detection time in order to obtain a total number of ionisation coincidence events; and
- determining the ionisation dose deposited in the scintillator by multiplying the total number of ionisation coincidence events by a predetermined second proportionality factor.

The invention also relates to a method for detection of an excitation dose deposited in a scintillator by ionising radiation comprising the steps of:
- irradiating the scintillator by means of the ionising radiation for a predetermined time, each interaction between the ionising radiation and the scintillator exciting the scintillator and giving rise to the emission of scintillation photons;
- detecting a moment of excitation of the scintillator by the ionising radiation using a first photodetector; then detecting a moment of reception of a scintillation photon emitted by the scintillator using a second photodetector, operating in single photon counting mode, separate from the first photodetector;

identifying each sequence consisting of the detection of a moment of excitation by the first photodetector, followed by the detection of a moment of reception by the second photodetector with a coincidence event;

measuring the detection time between the moment of excitation detected by the first photodetector and the moment of reception of a scintillation photon by the second photodetector for each coincidence event; and constructing a curve of the number of coincidence events as a function of the detection time;

calculating the integral of the curve of the number of coincidence events detected as a function of the detection time, between a minimum detection time and a detection time equal to n×τ where n is a constant between 1 and 10, advantageously approximately equal to 1, and τ is the fluorescence lifetime of the scintillator, in order determining an excitation dose deposited in the scintillator by multiplying the total number of excitation coincidence events by a predetermined third proportionality factor.

The invention also relates to a device for determination of an ionisation dose deposited in a scintillator by ionising radiation comprising:

a scintillator configured in order to be irradiated by the ionising radiation and adapted to emit scintillation photons at each interaction with the ionising radiation;

a first photodetector configured in order to detect a moment of excitation of a scintillator, and a second photodetector, separate from the first photodetector, configured to operate in single photon counting mode and configured in order to detect a moment of reception of a scintillation photon emitted by the scintillator;

identification means configured in order to:
  identify each sequence consisting of the detection of a moment of excitation by the first photodetector, followed by the detection of a moment of reception of a scintillation photon by the second photodetector with a coincidence event; and in order to
  measure the detection time between the moment of excitation detected by the first photodetector and the moment of reception of a scintillation photon by the second photodetector for each coincidence event;

calculation means configured in order to:
  construct a curve of the number of coincidence events as a function of the detection time;
  calculate the integral of the curve of the number of coincidence events detected as a function of the detection time, between a detection time equal to n×τ where n is a constant between 1 and 10, advantageously approximately equal to 1, and τ is the fluorescence lifetime of the scintillator, and a maximum detection time in order to obtain a total number of ionisation coincidence events; and
  determination of an ionisation dose deposited in the scintillator by multiplying the total number of ionisation coincidence events by a predetermined third proportionality factor.

The invention also relates to a device for determining an excitation dose deposited in a scintillator by ionising radiation comprising:

a scintillator configured in order to be irradiated by the ionising radiation and adapted to emit scintillation photons at each interaction with the ionising radiation;

a first photodetector configured in order to detect a moment of excitation of a scintillator, and a second photodetector, separate from the first photodetector, configured to operate in single photon counting mode and configured in order to detect a moment of reception of a scintillation photon emitted by the scintillator;

identification means configured in order to:
  identify each sequence consisting of detection of a moment of excitation by the first photodetector, followed by detection of a moment of reception of a scintillation photon by the second photodetector with a coincidence event; and in order to
  measure the detection time between the moment of excitation detected by the first photodetector and the moment of reception of a scintillation photon by the second photodetector for each coincidence event;

calculation means configured in order to:
  construct a curve of the number of coincidence events as a function of the detection time;
  calculate the integral of the curve of the number of coincidence events detected as a function of the detection time, between a minimum detection time and a detection time Δτ equal to n×τ where n is a constant between 1 and 10, advantageously approximately equal to 1, and τ is the fluorescence lifetime of the scintillator, in order to obtain a total number of excitation coincidence events; and
  determine an excitation dose deposited in the scintillator by multiplying the total number of excitation coincidence events by a predetermined third proportionality factor.

The invention will be better understood when reading the following description given solely by way of example and with reference to the appended drawings, in which:

FIG. 1 shows the device 1 for determination of the irradiation dose deposited in a scintillator by ionising radiation according to a first embodiment. This determination device 1 comprises:

Figure 1:
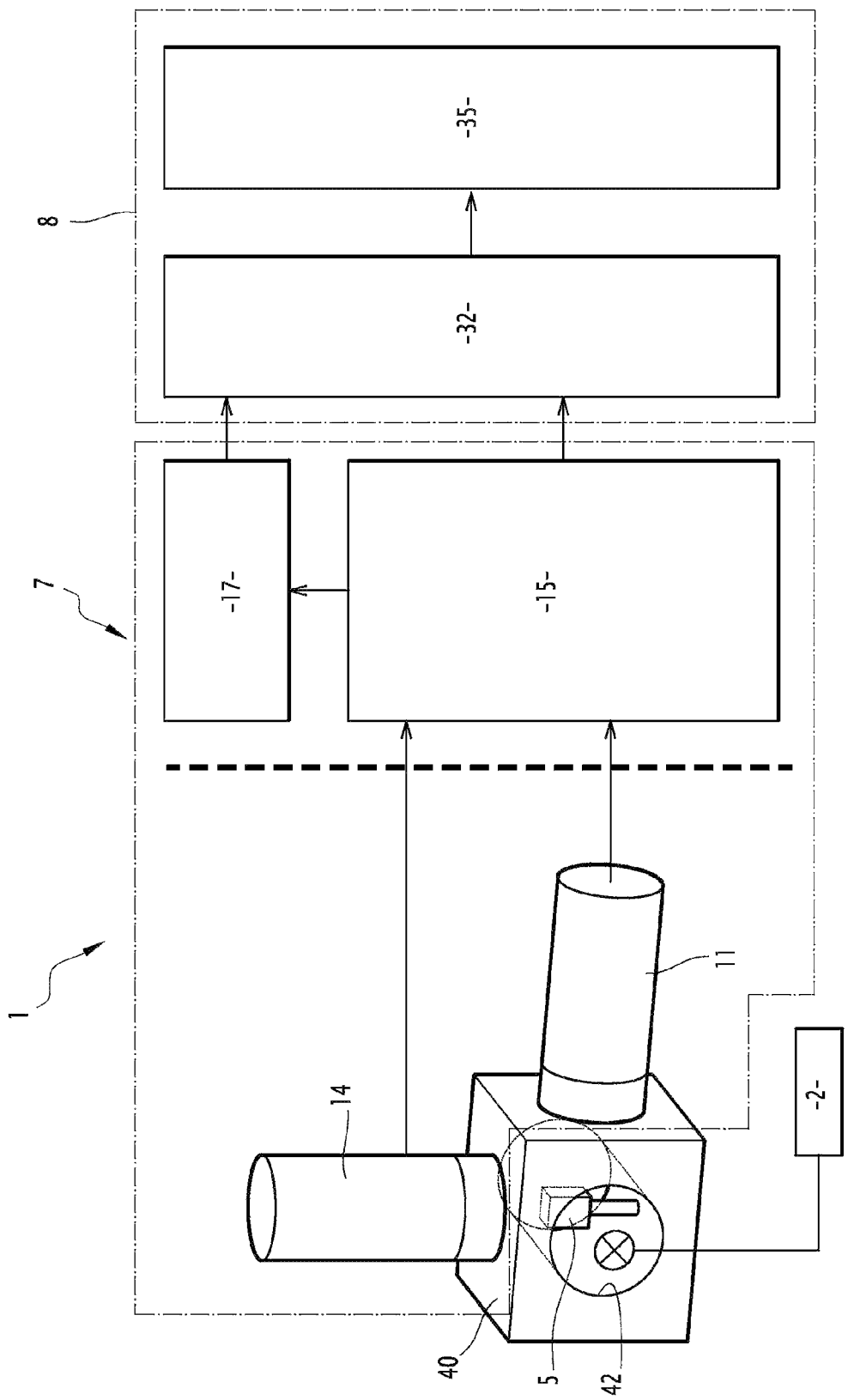
FIG. 1 is a schematic illustration of a device for determination of the dose according to a first embodiment.

a source 2 adapted to emit ionising radiation;

a scintillator 5 configured in order to be irradiated by the ionising radiation emitted by the source 2 during a predetermined irradiation time and adapted to emit scintillation photons at each of its interactions with the ionising radiation;

an acquisition device 7, configured in order to detect scintillation photons emitted by the scintillator 5; and an analysis device 8, configured in order to determine the dose deposited in the scintillator 5 from the scintillation photons detected by the acquisition device 7.

The ionising radiation is radiation of the particulate type or radiation of the electromagnetic type (photons), such as gamma radiation or X radiation. In the case of particulate radiation, the particles are charged particles, in particular electrons, protons, alpha particles or ions or non-charged particles, in particular neutrons, for example of neutrons producing charged particles in the scintillator by (n,p) nuclear reaction. The secondary electrons resulting from primary ionising interactions of the radiation types listed above with the scintillator are likewise detected.

The source 2 is any source adapted to emit ionising radiation as defined above. The source 2 is for example a particle accelerator, an artificial or natural radionucleide, a component of a nuclear installation, such as a nuclear reactor, nuclear waste, a fissile material intended for a civil or military application, a medical X ray generator, in particular an imaging apparatus or a research X ray generator, such as a synchrotron. In the embodiment shown, the source 2 is configured in order to emit a directional or collimated beam of ionising radiation. As a variant, the source 2 is adapted to emit ionising radiation at 4π steradians.

The scintillator is an organic scintillator, in particular a plastic scintillator. This is for example a scintillator of the BC-418 type sold by the company Bicron. As an alternative, the scintillator is an organic scintillator based on pure or diluted oxazoles or oxadiazoles in a transparent matrix, an organic scintillator obtained by chemical synthesis onto which have been grafted oxazole or oxadiazole chromophores of microscopic or nanometric size. According to another alternative, the scintillator is produced in an inorganic scintillating material, such as sodium iodide (NaI), cadmium telluride (CdTe), titanium monoxide (TiO), and yttrium aluminium garnet doped with cerium (YaG).

The scintillator 5 is for example in the form of a film with a surface area of one square centimetre and a thickness of 10 micrometres. Nevertheless, all the sizes, thicknesses and geometries are compatible with the invention, ranging from scintillating optical fibres with very small diameters to elements of very large sizes (plates of several metres), via powders, solid or liquid diluted solutions. According to one embodiment the scintillator is a liquid scintillator.

The scintillator 5 is chosen in such a way as to emit light at a wavelength within the range of wavelengths to which the acquisition device 7 is sensitive. The scintillator 5 emits for example in the ultraviolet range. As a variant, the scintillator 5 comprises any type of chromophore and emits light of which the wavelength is equal to the emission wavelength of this chromophore. In this case, the acquisition device 7 and in particular the photodetectors exhibit a sensitivity consistent with the emission wavelength of the chromophore.

In the following description an interaction between the incident ionising radiation and the scintillator 5 is called an "excitation event". Each excitation event causes the emission of scintillation photons by the scintillator 5. The emission of scintillation photons, occasioned by an excitation event, results in a light response of short duration. For certain scintillators, this light response corresponds to a flash of light with a duration of less than 1 microsecond. The number of photons emitted by the scintillator 5 per unit of time in the course of this flash of light follows a scintillation decay curve. The shape of this scintillation decay curve is not characteristic of a particular scintillator but is common to all the scintillators.

The acquisition device 7 comprises a first photodetector 11, a second photodetector 14, separate from the first photodetector 11 and means 15 for identifying a coincidence event.

The first and the second photodetector 11, 14 are for example photomultiplier tubes. As a variant, they are photomultipliers with microchannel plates or diode detectors of the CCD type. The second photodetector 14 is in particular formed by any light detector device capable of functioning in single photon counting mode.

The first photodetector 11 is configured in order to detect a moment of excitation of the scintillator 5 corresponding to an excitation event. To this end, it is configured in order to detect any emission of scintillation photons by the scintillator 5, and in particular the emission of a first scintillation photon resulting from an excitation event. The moment of detection of the first scintillation photon is identified with the moment of excitation of the scintillator 5. The first photodetector 11 is also configured in order to emit a signal of detection of this first scintillation photon. The first photodetector 11 is used with its inlet window fully optically open. Thus, it is not limited by a diaphragm. Thus the probability of detection, by this photodetector 11, of the first photons emitted by the scintillator 5 (short time) is increased.

The second photodetector 14 is configured in such a way as to detect only a single photon for each excitation event produced in the scintillator 5. It therefore functions in single photon counting mode. It is optically less open to the scintillation photons than the first photodetector 11. In particular, a diaphragm is placed upstream of the inlet window of the second photodetector 14 in such a way as to delimit an inlet opening for the scintillation photons of which the area is chosen in such a way that this second photodetector receives only a single scintillation photon, in its direction of observation, for each moment of excitation detected by the photodetector 11. The second photodetector 14 is adapted to emit a signal of detection of the scintillation photon.

The area of the inlet aperture of the second photodetector 14 is smaller, in particular very much smaller than the area of the inlet aperture of the first photodetector 11. In particular, the area of the inlet aperture of the second photodetector 14 is less than 5% of the area of the inlet aperture of the first photodetector 11.

The identification means 15 are configured in order to receive successively, in a first step, a detection signal coming from the first photodetector 11, indicating the detection of a first scintillation photon resulting from an excitation event in the scintillator 5, then in a second step, following the first step, a detection signal coming from the second photodetector 14 indicating the reception of a scintillation photon by the second photodetector 14. It is also adapted to identify each sequence consisting of the reception of a detection signal coming from the first photodetector 11 and the reception of a detection signal coming from the second photodetector 14 with a coincidence event.

Thus, once a first photon is detected by the first photodetector 11, the identification means 15 are configured in order to await the detection of a scintillation photon by the second photodetector 14, without taking account of possible detections of photons by the first photodetector 11.

Once the scintillation photon is detected by the second photodetector 14, the identification means 15 are configured in order to await the detection of a scintillation photon by the first photodetector 11, without taking account of photons possibly detected by the second photodetector 14.

The identification means 15 are configured in order to trigger a timer 17 when they receive a detection signal coming from the first photodetector 11, then in order to stop the timer 17 when they receive the following detection signal coming from the second photodetector 14. Thus the moment of triggering the timer 17 corresponds substantially to the moment of excitation of the scintillator 5 during the considered excitation event. In particular, the triggering moment corresponds to the moment of excitation of the scintillator 5 with a temporal uncertainty less than or equal to a nanosecond. The timer 17 is adapted to measure, for each coincidence event, the detection time Δt elapsed between the moment of excitation of the scintillator 5 and the moment of reception of a scintillation photon by the second photodetector 14.

The identification means 15 comprise for example a time-amplitude converter configured in order to receive the detection signal from the first photodetector 11 and the detection signal from the second photodetector 14, and in order to supply an output pulse of which the amplitude is proportional to the time elapsed between the moment of excitation detected by the first photodetector 11 and the moment of reception of the scintillation photon by the second photodetector 14. Conventionally, first and second discriminators are interposed respectively between the output of the first and second photodetectors 11, 14 and the time-amplitude converter. The first and second discriminators are configured in order to eliminate, by setting up adjustable voltage thresholds, the signals of very low amplitudes emitted by the photodetectors 11, 14 which may be interpreted as noise and in order, after reception of non-standard signals emitted by the photodetectors 11, 14, to deliver standard electrical signals to the inputs of the time-amplitude converter.

The analysis device 8 comprises:
counting means 32 configured in order to count the number of coincidence events identified by the identification means 15 during a predetermined irradiation time; and
calculation means 35 configured in order to obtain the irradiation dose deposited in the scintillator 5 based on the number of coincidence events counted by the counting means 32 and a predetermined proportionality factor.

The counting means 32 are adapted to count the number of coincidence events detected by the determination device 1 during the predetermined irradiation time by incrementation of a counter indicating the number of coincidence events detected.

In particular, the counting means 32 comprise means for constructing a histogram which are configured in order to construct a histogram of the time elapsed between the excitation of the scintillator 5 seen by the first photodetector 11 and the emission of scintillation seen by the second photodetector 14. For each coincidence event identified by the identification means 15, they are adapted to increment by one unit the column of this histogram corresponding to the detection time measured by the timer 17 for this coincidence event. At the end of the predetermined irradiation time, the content of each column of the histogram corresponds to the number of coincidence events corresponding to one and the same detection time. The histogram obtained also corresponds to the precise measurement, with nanosecond temporal resolution, of the intensity of scintillation emitted by the scintillator 5 over time.

In the determination device 1 according to the first embodiment, the counting means 32 are adapted to add up the contents of each column of the histogram in order to obtain the total number of coincidence events detected during the predetermined irradiation time.

The counting means 32 comprise for example a multichannel analyser connected to the output of the time-amplitude converter. The multichannel analyser is adapted to increment by one unit the content of the memory of the channel of which the number is proportional to the amplitude of the pulse supplied by the time-amplitude converter.

In the first embodiment, the calculation means 35 are configured in order to calculate the irradiation dose deposited in the scintillator 5 by multiplication of the total number of coincidence events counted, or integral of the histogram obtained, by the counting means 32 during the predetermined irradiation time by a predetermined proportionality factor.

The predetermined proportionality factor is for example stored in a memory of the analysis device 8. It depends solely upon the characteristics of the acquisition device 7, the analysis device 8 and the scintillator 5, that is to say the characteristics of the acquisition chain. It is independent of the distance of the scintillator 5 from the source 2, the characteristics of the ionising radiation (type of ionising radiation, energy of the ionising radiation, flow etc.).

The proportionality factor is for example predetermined using a reference source of ionising radiation 2 for which the value of the dose deposited at the distance d is known. The total number of coincidence events detected in the same conditions is then determined with the aid of the device for determination of the dose according to the invention. The ratio between the known irradiation dose and the total number of coincidence events determined corresponds to the predetermined proportionality factor.

As an option, the calculation means 35 are configured in order to calculate a value of the corresponding dose rate by dividing the calculated irradiation dose by the predetermined irradiation time.

In the first embodiment, the scintillator is disposed in a compartment 40. In the example illustrated, the compartment 40 has a parallelepipedal shape, in particular the shape of a cube.

The compartment 40 is impermeable to light, that is to say that it prevents the light coming from the exterior of the compartment 40 from entering the compartment 40 and that it likewise prevents the light produced in the compartment 40 from leaving the compartment 40. The compartment 40 comprises an inlet window 42 for the ionising radiation and an outlet window for the ionising radiation. The inlet window 42 and the outlet window are formed in opposing faces of the compartment 40. The inlet window 42 and the outlet window are transparent to ionising radiation, that is to say that they allow the ionising radiation to pass through without significantly affecting its characteristics. On the other hand, they are impervious to light. To this end, they are for example coated with a film made of a material which is opaque to light whilst being transparent to ionising radiation, such as aluminium. This material will have to be chosen in a range of metal materials which are ductile, for example tantalum, and therefore readily transformable by rolling, in order to obtain micrometric window thicknesses. Likewise it should not be scintillating in order not to disrupt the measurement. To this end, organic materials in particular will be avoided.

The source 2 of ionising radiation is arranged outside the compartment 40 facing the inlet window 42. Thus the ionising radiation, in particular the beam of ionising radiation, emitted by the source 2 is adapted to penetrate into the compartment 40 through the inlet window 42. After interaction with the scintillator 5, the ionising radiation can leave the compartment 40 through the outlet window.

The first photodetector 11 and the second photodetector 14 are configured in order to detect scintillation photons emitted by the scintillator 5 inside the compartment 40. In the illustrated example, the first photodetector 11 and the second photodetector 14 are disposed at two adjacent faces of the compartment 40.

Figure 2:
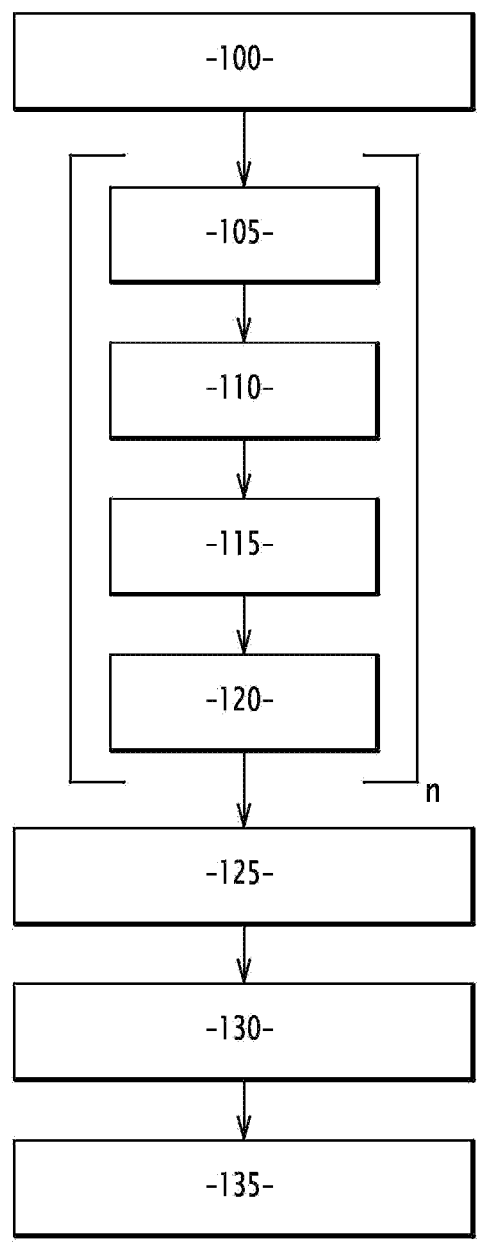
FIG. 2 is a schematic representation of a method for determination of the dose according to a first embodiment.

The method for determination of the dose deposited in the scintillator 5 according to a first embodiment will now be explained with reference to FIG. 2. This method implements the device 1 for determination of the dose deposited. It uses the technique of time-correlated single photon counting.

In a step 100, the scintillator 5 is irradiated for a predetermined irradiation time by means of the ionising radiation emitted by the source 2.

In a step 105, the first photodetector 11 detects a first scintillation photon and emits a signal of detection of this photon. The moment at which the first photodetector 11 has detected the first scintillation photon is identified with a moment of excitation of the scintillator 5 resulting from an interaction between the ionising radiation and the scintillator. The identification means 15 receive the detection signal coming from the first photodetector 11. They trigger the timer 17. The timer 17 then counts the time elapsed from the moment $t_1$ of excitation of the scintillator 5.

Then, in a step 110, the second photodetector 14 detects a scintillation photon at a moment $t_2$ and emits a signal of detection of this scintillation photon. The identification means 15 receive the detection signal coming from the second photodetector 14. The reception of the detection signal coming from the second photodetector 14 causes the stoppage of the timer 17. Thus the timer 17 has measured the detection time elapsed between the moment $t_1$ of excitation of the scintillator 5 and the moment $t_2$ of detection of the scintillation photon by the second photodetector 14.

In a step 115, the identification means 15 identify the sequence consisting of the reception of the detection signal coming from the first photodetector 11 in the step 105 and the reception of the detection signal coming from the second photodetector 14 in the step 110 with a coincidence event. Each coincidence event is associated with a detection time measured by the timer 17.

In a step 120, the counting means 32 increment the counter which indicates the number of coincidence events detected. To this end, they increment for example by one unit the column of the histogram representing the number of coincidence events as a function of the detection time corresponding to the detection time measured in the step 110.

At the end of the step 110, that is say as soon as the identification means have received a signal of detection of a photon coming from the second photodetector 14, they are ready again to receive a sequence consisting of a detection signal coming from the first photodetector 11 and a detection signal coming from the second photodetector 14 in such a way as to identify a following coincidence event.

Thus the determination device 1 detects a plurality n of successive coincidence events during the predetermined irradiation time of the scintillator 5 by the ionising radiation. Each coincidence event causes the incrementation of the counter by the counting means 32.

In a step 125, the counting means 32 count the number of coincidence events detected during the predetermined irradiation time of the scintillator 5. At the end of the predetermined irradiation time, the counter indicates the total number of coincidence events detected. For example, the content of each column of the histogram corresponds to the number of coincidence events associated with one and the same measured detection time. According to the first embodiment, the counting means 32 for example add up the number of coincidence events of all the columns of the histogram in order to obtain a total number of coincidence events detected during the predetermined irradiation time.

In a step 130, the calculation means 35 obtain the irradiation dose deposited in the scintillator 5 during the predetermined irradiation time as a function of the total number of coincidence events and of the predetermined proportionality factor. To this end, according to the first embodiment, the calculation means 35 multiply the total number of coincidence events counted by the counting means 32 during the predetermined irradiation time by the predetermined proportionality factor. Thus they obtain the irradiation dose deposited in the scintillator 5.

As an option, in a step 135, the calculation means 35 calculate a value of the corresponding dose rate by dividing the irradiation dose calculated in the step 130 by the predetermined irradiation time.

The method of determination of the irradiation dose deposited in the scintillator 5 is for example carried out by arranging the scintillator 5 at a given depth in an object. According to one embodiment, the scintillator is located outside the body of a human or animal.

As a variant, the method is carried out by placing the scintillator 5 against an external surface of an object. According to one embodiment, the scintillator is situated outside the body of a human or an animal.

The invention also relates to a method of determination of a curve $C_1$ giving the dose deposited in the scintillator 5 as a function of the distance d between the scintillator 5 and the source 2 of ionising radiation. This method comprises the determination of the dose deposited in the scintillator 5 at different distances d from the source 2 by carrying out, at each of these distances d, the method of determination of the dose deposited as described above with reference to FIG. 2.

More precisely, the scintillator 5 is arranged at a distance d from the source 2. Then the method of determination of the dose deposited as described above is carried out. At the end of the step 130, the dose deposited at the distance d is obtained.

This method is repeated, all other things being equal, by arranging the scintillator 5 at different distances d from the source 2, and for each distance d a value of the dose deposited in the scintillator 5 at this distance d is obtained. Next the curve $C_1$ is constructed on the basis of these values of the dose deposited.

Within the context of this method, only the distance d from the source 2 varies between each implementation of the method of determination of the dose. In particular, the predetermined irradiation time and the source of ionisation are identical for each implementation of the method.

According to one embodiment, the distance d corresponds to a thickness of air between the scintillator 5 and the source 2.

According to variants, the distance d corresponds to a depth in a material of interest. In this case for example a thickness d of this material of interest is interposed between the source 2 and the scintillator 5. The deposited dose determined at each implementation of the method of determination with a thickness d of material between the source 2 and the scintillator 5 then corresponds to the dose deposited at a depth d of this material or a material having an equivalent density.

The use of PMMA (polymethyl methacrylate) as material of interest is particularly advantageous in the medical field in order to simulate the dose deposited at a given depth in the human body. Indeed, PMMA has a density and a chemical composition close to those of the human body and therefore a similar behaviour under irradiation by ionising radiation.

Figure 3:
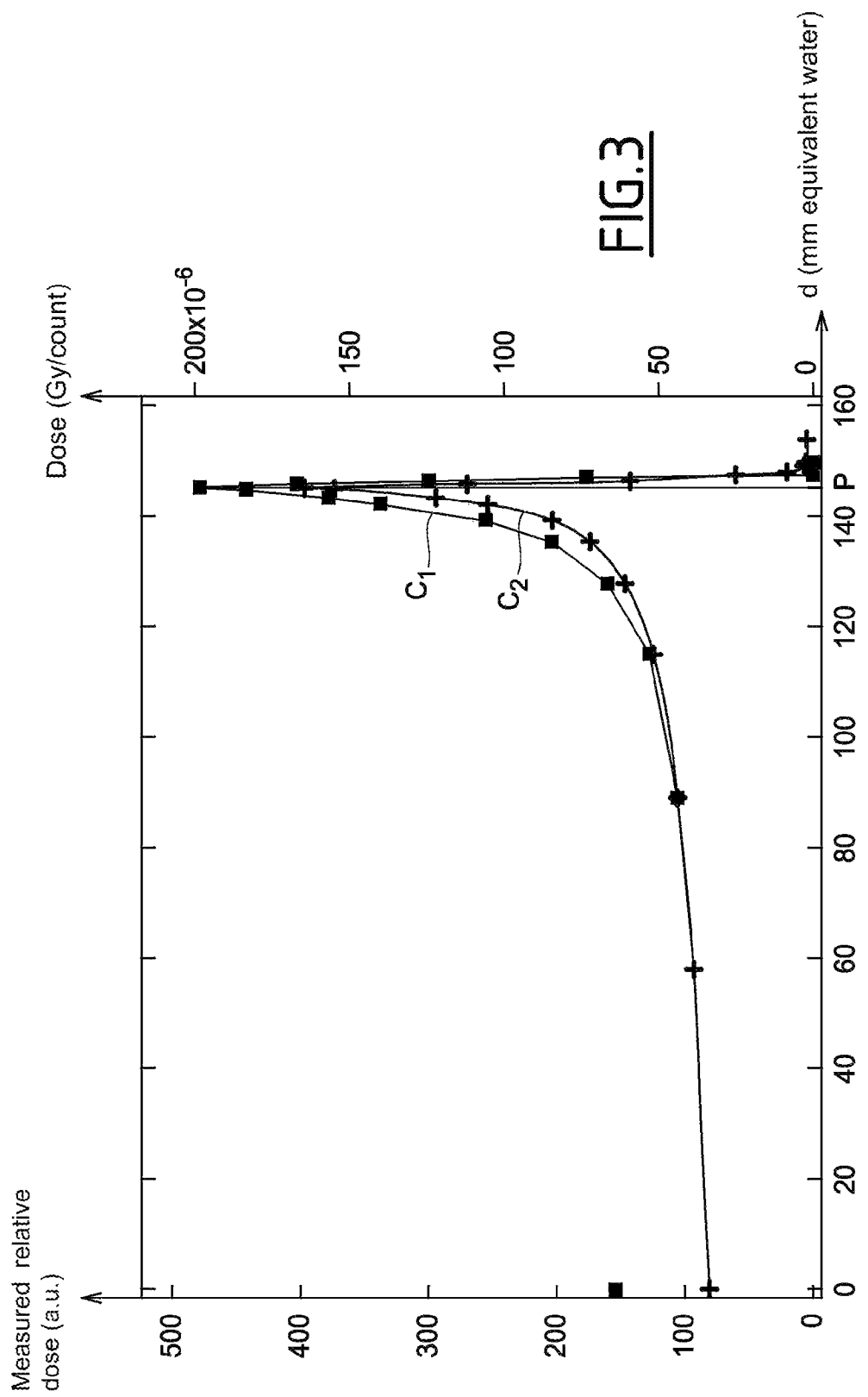
FIG. 3 is a graph representing curves of the dose deposited as a function of the distance to the source of ionising radiation, obtained respectively by the method of determination according to the invention and by a conventional method using an ionisation chamber.

FIG. 3 illustrates an example of a curve $C_1$ obtained by the method of determination according to the invention, as well as a curve $C_2$ obtained by the conventional method of determination of the dose deposited using an ionisation chamber. The comparison of the curves $C_1$ and $C_2$ shows that the method of determination of the dose deposited according to the invention has a greater sensitivity than the conventional method at the depth of the Bragg peak P where the deposition of energy is greatest and where the consequences of an imprecise measurement of the dose deposited may be the most dangerous.

The device 1' for determination of the dose deposited in the scintillator 5 according to a second embodiment will now be described. Only the differences between the device 1' according to the second embodiment and the device 1 according to the first embodiment are explained below.

Figure 4:
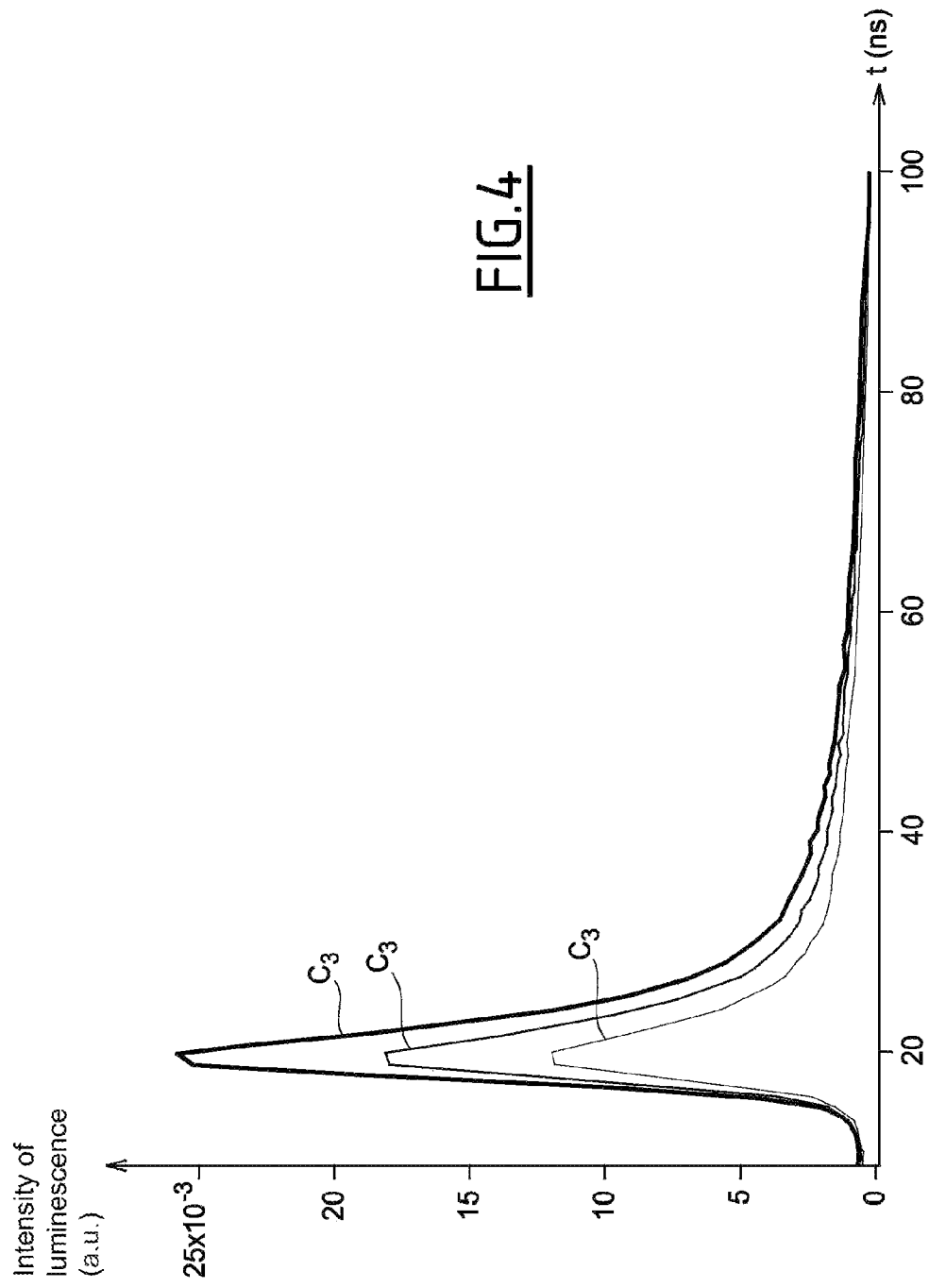
FIG. 4 is a graph representing curves obtained by the device for determination of the dose according to a second embodiment at different distances from the source of ionising radiation.

The counting means 32' of the determination device 1' differ from the counting means 32 of the determination device 1 in that they also comprise means for construction of a curve $C_3$ by smoothing on the basis of the histogram representing the number of coincidence events as a function of the detection time. This curve $C_3$ represents the number of coincidence events detected as a function of the detection time. It has the shape of the scintillation decay curve. FIG. 4 illustrates examples of curves $C_3$ obtained at different distances d from the source 2.

The counting means 32' of the determination device 1' are configured in order to obtain the total number of coincidence events identified during the predetermined irradiation time by calculating the integral of the curve $C_3$.

The calculation means 35' of the determination device 1' are configured in order to obtain the irradiation dose deposited in the scintillator 5 based on the integral of the curve $C_3$ and the predetermined proportionality factor. In particular, the calculation means 35' are configured in order to calculate the irradiation dose by multiplication of the integral of the curve $C_3$ by the predetermined proportionality factor.

The method of determination of the dose deposited in the scintillator 5 according to a second embodiment makes use of the determination device 1' according to the second embodiment. It differs from the method according to the first embodiment only in that during the step 125 the counting means 32' construct, from the histogram, the curve $C_3$ representing the number of coincidence events detected as a function of the detection time. The counting means 32' then count the total number of coincidence events identified by calculating the integral of the curve $C_3$.

In the course of the step 130, the calculation means 35' calculate the irradiation dose deposited in the scintillator 5 based on the integral of the curve $C_3$ calculated by the counting means 32' in the step 125 and the predetermined proportionality factor. In particular, the calculation means 35' calculate the irradiation dose by multiplication of the integral of the curve $C_3$ by the predetermined proportionality factor.

Figure 5:
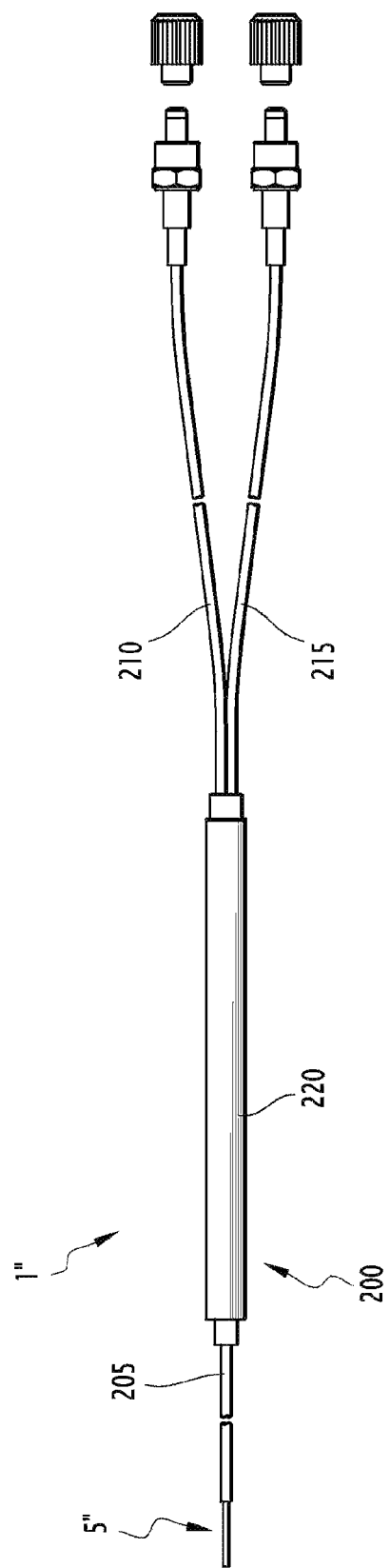
FIG. 5 is a schematic representation of a part of a device for determination of the dose according to a third embodiment.

FIG. 5 illustrates a part of a device 1" for determination of the dose deposited in the scintillator 5 according to a third embodiment. The elements identical to those of the first and second embodiments have the same references. Only the differences with respect to the first and second embodiments are explained below.

In the third embodiment, the scintillator 5" is in the form of a scintillating optical fibre. This scintillating optical fibre is in the form of a multimode scintillating optical fibre. It has a diameter less than 200 µm. Its length is between 500 µm and several centimetres.

The scintillator 5" is arranged at the end of an assembly of optical fibres 200 adapted to transfer at least a part of the scintillation photons emitted by the scintillator 5" in the course of an excitation event to the acquisition device 7, more particularly to the first and second photodetectors 11, 14.

More particularly, the assembly 200 comprises a non-scintillating main optical fibre 205, at one end of which the scintillator 5" is arranged. At its end opposite the scintillator 5", the main optical fibre 205 is divided into two secondary optical fibres 210 and 215. The secondary optical fibres 210 and 215 connect the main optical fibre 205 respectively to the first photodetector 11 and to the second photodetector 14.

In the illustrated embodiment, the secondary optical fibres 210 and 215 and the main optical fibre 205 have substantially the same diameter. In particular, they are optical fibres of the same type. They are for example of fibres of the HCP1000 type. The secondary optical fibres 210 and 215 are coupled to the main optical fibre 205 by means of an appropriate coupler 220.

The diameter of the scintillator 5", that is to say of the scintillating optical fibre, is substantially equal to the diameter of the main optical fibre 205.

The scintillator 5" is surrounded by a sheath made of a material which is transparent to ionising radiation, but opaque to light. Thus the sheath is adapted to allow the ionising radiation to pass through to the scintillator 5". On the other hand, the scintillation photons emitted by the scintillator 5" do not pass through the sheath. Furthermore, the light coming from the environment outside the scintillator 5" cannot enter the sheath. The sheath ensures that the scintillation photons transferred towards the first and the second photodetector 11, 14 originate solely from the interaction between the ionising radiation and the scintillator 5".

In one embodiment, the secondary optical fibres 210 and 215 and the main optical fibre 205 have very different diameters. In particular, the secondary optical fibre 215 placed in the direction of the second photodetector 14 has a cross-section 95% less than the cross-section of the secondary optical fibre 210 placed in the direction of the first photodetector 11. In this case, the first photodetector 11 and the second photodetector 14 have identical inlet openings for photons, corresponding in particular to the full optical opening of the inlet windows thereof. The first and the second photodetectors 11, 14 are not limited by a diaphragm. This variant results in reduced production costs because of the omission of the diaphragm.

The method of determination of the dose deposited using the determination device 1" according to the third embodiment is identical to the methods according to the first and the second embodiment.

In one variant, the scintillator is introduced directly into the human or animal body, before the implementation of the method according to the invention. This introduction is performed for example with the aid of the device 1" by introducing the optical fibre by means of a catheter. The method according to the invention is then carried out without an invasive step in the organism once the implantation of the scintillator 5" is effected.

The method of determination of the dose according to the first, the second and the third embodiment is particularly advantageous.

In the first place, in each of these embodiments, the scintillator, which is the part of the device intended to be irradiated, is very compact, and in particular much more compact than an ionisation chamber. Indeed, the scintillator has for example a sensitive volume of approximately 0.1 mm$^3$, whilst the smallest ionisation chambers have a side measuring at least 1 mm. The device according to the invention therefore has the advantage of enabling the measurement of the dose deposited in cramped places, which is not the case for the ionisation chamber. This feature is particularly interesting in the medical fields of imaging and of radiotherapy.

Furthermore, the scintillator can be placed within an object of interest, which makes it possible in particular to follow the dose deposited in real time directly in the object of interest. Furthermore, the device and the associated method of determination of the dose according to the invention make it possible to obtain a great sensitivity of measurement even for very low doses deposited in the scintillator, ranging up to several nGray·min$^1$ for volumes of scintillators of the order of a mm$^3$. This sensitivity derives in particular from the use of the time-correlated single photon counting technique, that is to say the detection of coincidence events with the aid of two photodetectors. In fact, the use of this technique makes it possible to detect only events resulting effectively from an interaction between the scintillator and the ionising radiation. Consequently, the total number of events detected is directly proportional to the dose deposited in the scintillating material. Therefore it is not necessary to make use of correction factors which are determined empirically and are dependent upon a multiplicity of factors.

The increased sensitivity also results from the fact that the measurement of a light, namely the light emitted under radiation, is an intrinsically more sensitive method than the measurement of the charges produced under the effect of radiation (ionisation chamber). In fact, the quantity of energy for producing a visible photon in an organic scintillator is estimated at about ten eV whilst the fact of producing an ion-electron pair, collectable by a measurement device, is estimated at several hundred eV.

Furthermore, the sensitivity of detection is also increased as compared to a method using an ionisation chamber because the ionisation is much greater in a solid than in a gas.

In addition, a photodetector is capable of detecting very small amounts of light, whilst it is not possible to measure very small amounts of current in the case of an ionisation chamber.

Furthermore, the device according to the invention is advantageous from an economic point of view, in particular due to the low manufacturing cost of a scintillator.

The operation of the second photodetector in single photoelectron mode (counting a single photon) ensures constant illuminance of this second photodetector and therefore operation with low noise and without saturation.

Due to its principle, measurement in coincidence eliminates all the events which are not correlated, such as the noise intrinsic to the detection and measurement equipment, but also all the events associated with the presence of external interference (radioactive environment, electromagnetic noise associated with medical equipment, accelerators and reactors, for example) which could affect the accuracy of the measurement.

The device according to the invention makes it possible, within the context of the measurement of the dose or of the dose rate by scintillation, to eliminate the non-correlated events and to discriminate the ionising radiation by measurement of scintillation decay by coincidence, in particular in the case of liquid scintillation.

According to a variant, the source 2 is a non-medical X ray generator, for example of a non-destructive industrial control apparatus.

According to a variant, the source 2 is adapted to emit ionising radiation with any solid angle.

According to a variant, the scintillator is for example an organic scintillator such as para-terphenyl or anthracene.

According to another variant, the radiation is non-ionising radiation, in particular UV radiation.

According to a variant, the first and the second photodetector 11, 14 are detectors with diodes of the CMOS type.

According to a variant of the third embodiment, the scintillator 5″ is a multimode scintillating optical fibre having a diameter greater than or equal to 100 μm. Its length is for example between 500 μm and several metres.

It will be noted that the curves $C_1$ and $C_3$ represented respectively on FIGS. 3 and 4 have been obtained by implementing the method of determination according to the invention with a source 2 emitting alpha radiation. The alpha radiation used during this experiment was emitted by a synchrotron accelerator accelerated to 150 MeV/u. The distance d in the abscissa on FIG. 3 corresponds to the thickness of PMMA through which the radiation passes.

The curve $C_2$ of FIG. 3 results from a conventional measurement carried out in the same conditions with an ionisation chamber.

The comparison of curves $C_1$ and $C_2$ of FIG. 3 confirms that the method of determination according to the invention makes it possible to obtain the irradiation dose deposited by alpha radiation with a greater sensitivity of measurement than a conventional method using a reference ionisation chamber.

Moreover, it will be noted that the curves $C_3$ of FIG. 4 each reproduce the shape of the conventional scintillation decay curve. The good reproduction of the shape of this decay curve confirms the better efficiency of the method of detection according to the invention for the measurement of the dose deposited by alpha radiation compared to a method using a single photomultiplier.

The inventors have also used the method according to the invention with a source 2 emitting gamma radiation. The gamma radiation used during this experiment was emitted by a cobalt 60 source with characteristic rays at 1.17 MeV and 1.33 MeV and with activity at 1.85 TBq.

The scintillator was a piece of scintillating optical fibre BCF-12 marketed by Saint-Gobain which is 1 mm in diameter and 1 cm long.

Figure 6:
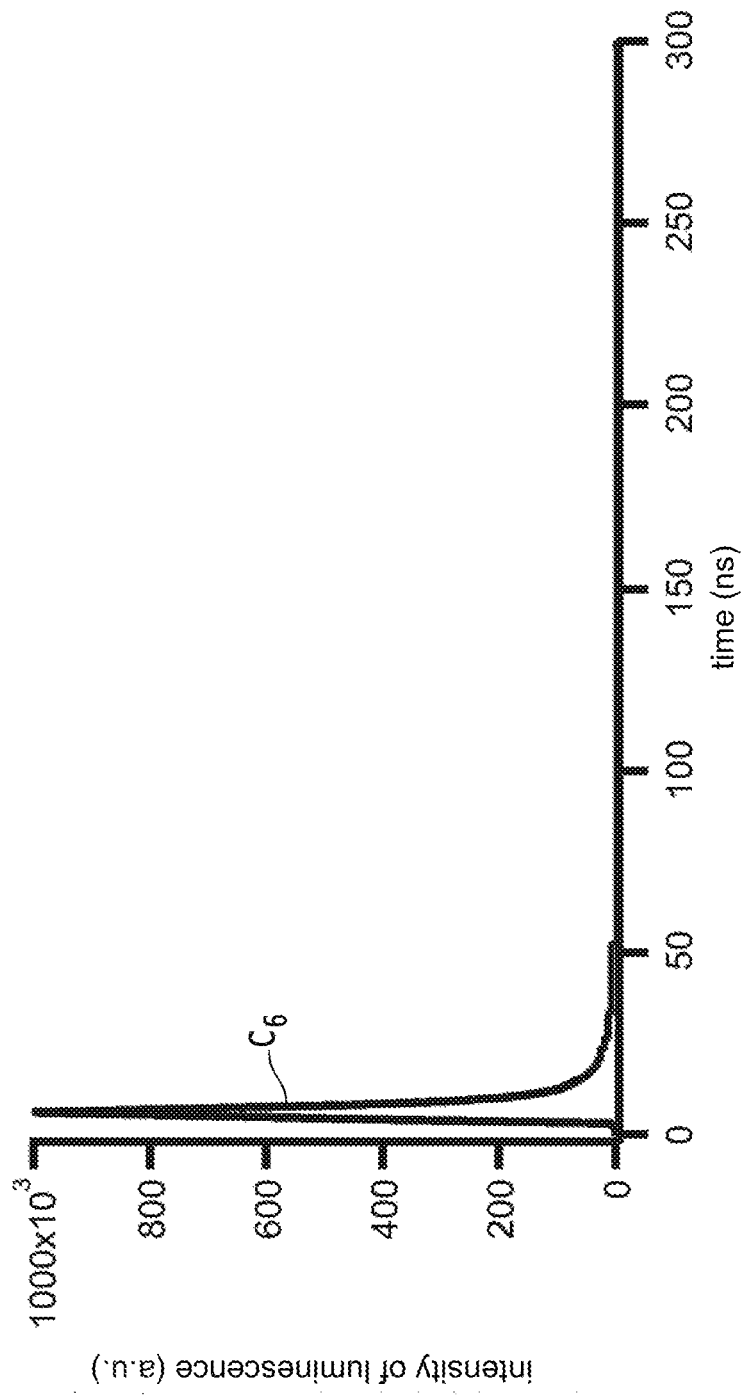
FIGS. 6 to 9 are graphs representing curves obtained with the device for determination of the dose according to the invention.
Figure 7:
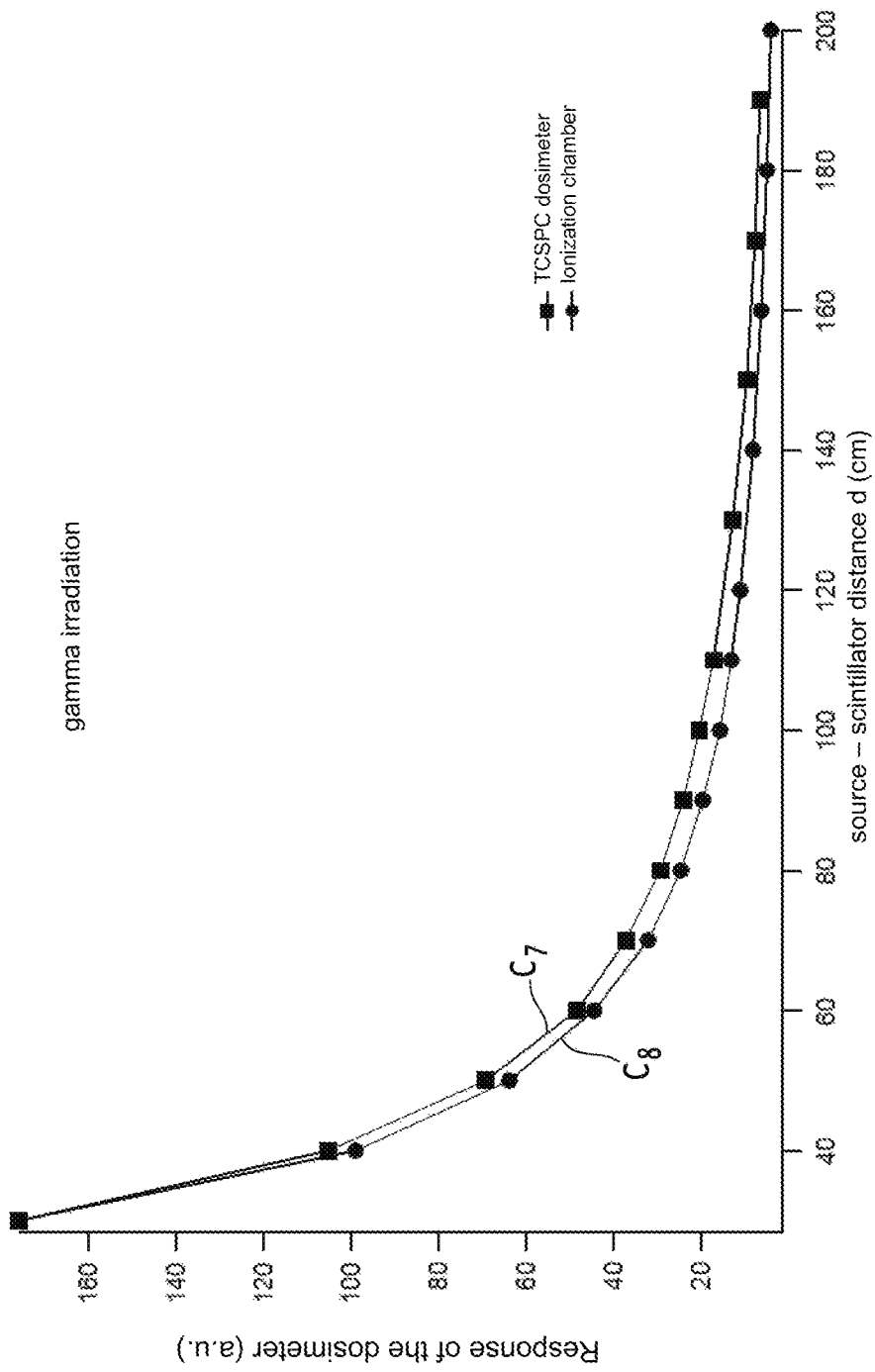

This experiment made it possible to obtain the scintillation decay curves $C_6$ and $C_7$ represented on FIGS. 6 and 7.

The curve $C_6$ is analogous to the curves $C_3$ of FIG. 4. As in the case of FIG. 4, it can be seen that the curve $C_6$ reproduces the shape of the scintillation decay curve without saturation in the first 20 nanoseconds of the decay, which confirms the better efficiency of the method of detection according to the invention for the measurement of the dose deposited by gamma radiation compared to a method using a single photomultiplier, which does not permit such reproduction.

The curve $C_7$ of FIG. 7 represents the irradiation dose predetermined by the method according to the invention as a function of the distance d to the irradiation source. The curve $C_8$ of FIG. 7 is an analogous curve obtained with an ionisation chamber.

The inventors have also used the method according to the invention with a source 2 emitting X radiation.

The scintillator was a piece of scintillating optical fibre BCF-12 marketed by Saint-Gobain which is 1 mm in diameter and 1 cm long.

Figure 8:
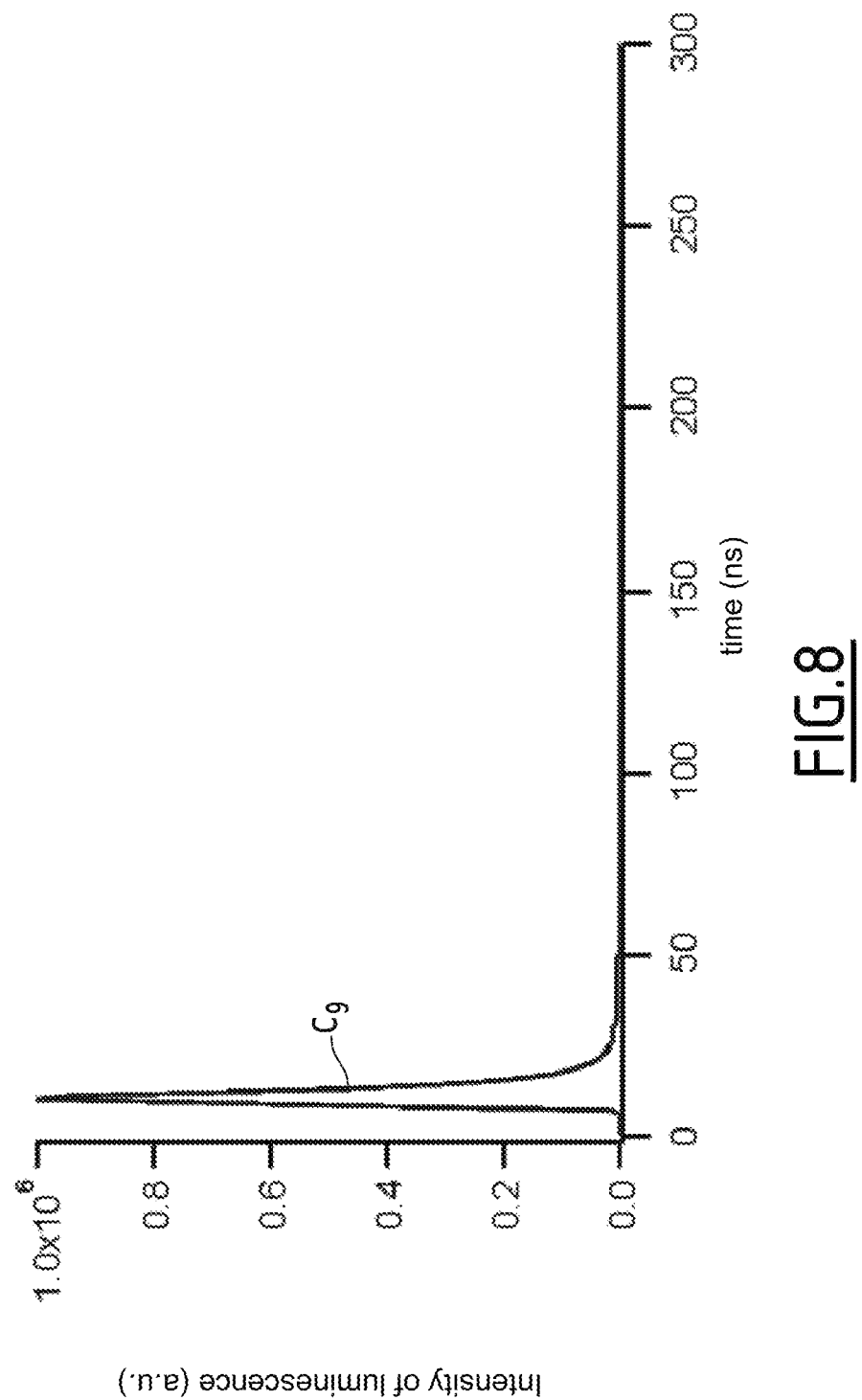
Figure 9:
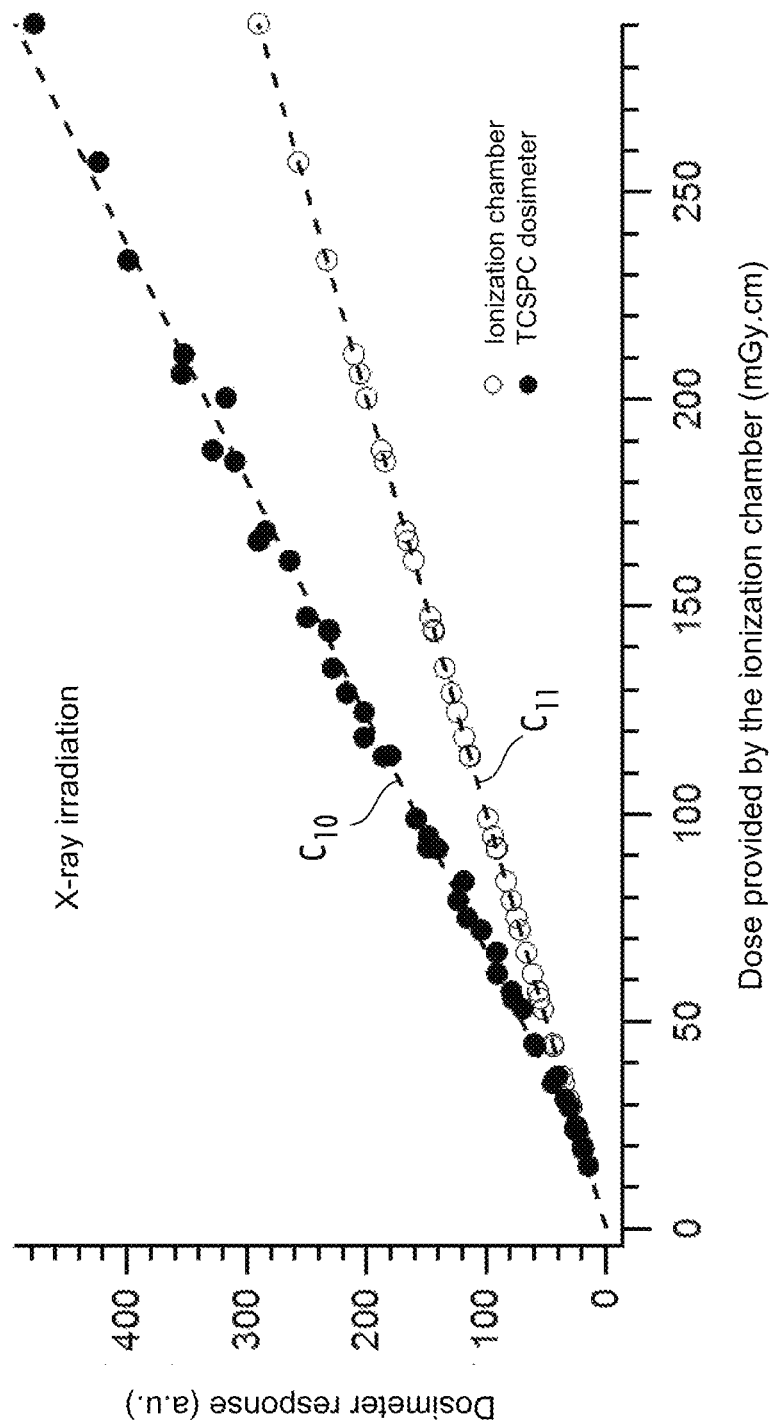

The curves $C_9$ and $C_{10}$ represented respectively on FIGS. 8 and 9 have been obtained during this experiment.

The curve $C_9$ is analogous to the curve $C_6$ illustrated on FIG. 6. It can be seen that it also reproduces the shape of the scintillation decay curve, which confirms the improved efficiency of the method of detection according to the invention for the measurement of the dose deposited by X radiation compared to a conventional method using a single photomultiplier.

Furthermore, the irradiation dose determined by this method has been compared to the dose measured by an ionisation chamber. The results of this comparison are illustrated on FIG. 9, on which the curves $C_{10}$ and $C_{11}$ represent respectively the irradiation dose measured by means of the method of determination of the dose according to the invention and the response of the ionisation chamber as a function of the dose delivered by the ionisation chamber in mGy·cm.

It will be noted that the slope of the curve $C_{10}$ is greater than that of the curve $C_{11}$ which confirms the improved efficiency and dynamics of the method of determination according to the invention, already noted on FIG. 8, compared to a method using an ionisation chamber.

Furthermore, it will be noted on FIG. 9 that the device for determination of the dose according to the invention has a resolution in dose rate which is much higher, of the order of 70%, than that of a standard ionisation chamber. Indeed, the difference between the slopes of the straight lines $C_{10}$ and $C_{11}$ of FIG. 9 is approximately equal to 70%.

Finally, these experiments confirm that the temporal resolution, in the measurement of the dose rate passing through the scintillator, of the device for determination of the dose according to the invention is very good, since it is lower than 0.1 second.

According to a variant of the determination device according to the first embodiment, the second photodetector 14 does not function in single photon counting mode. In this case the first and the second photodetectors 11, 14 have for example physical openings of the same dimensions. In particular, neither the first, nor the second photodetector 11, 14 are limited by a diaphragm.

The method of determination according to this variant is analogous to the method according to the first embodiment, the only difference being that the second photodetector 14 does not function in single photon counting mode.

According to a variant of the determination device according to the third embodiment, the second photodetector 14 does not function in single photon counting mode. The first and second photodetectors 11, 14 have for example physical openings of the same dimensions and the secondary optical fibres 210 and 215 have substantially identical diameters.

The method of determination according to this variant is analogous to the method according to the third embodiment, the only difference being that the second photodetector 14 does not function in single photon counting mode.

According to a variant of the device 1', 1" for determination of the irradiation dose according to the second and the third embodiment as described above, the calculation means 35', 35" are further configured in order to determine an ionisation dose deposited in the scintillator 5', 5" by the ionising radiation when the scintillator 5', 5" is irradiated during the predetermined irradiation time.

To this end, the calculation means 35', 35" are configured in order to:
    calculate the integral of the curve representing the number of coincidence events detected as a function of the detection time, between a detection time $\Delta\tau$ equal to $n\times\tau$, and a maximum detection time in order to obtain a total number of ionisation coincidence events; and in order to
    determine the ionisation dose deposited in the scintillator 5', 5" by multiplying this total number of ionisation coincidence events by a predetermined second proportionality factor.

$\tau$ is the fluorescence lifetime of the scintillator 5', 5". The fluorescence lifetime $\tau$ is an intrinsic characteristic of the scintillator 5', 5". Its value is for example supplied by the producer of the scintillator 5', 5".

n is a constant chosen in such a way that, over the detection time interval between $n\times\tau$ and the maximum detection time, only the coincidence events resulting from the ionisation of the scintillator 5', 5" are added up.

The constant n is in particular comprised between 1 and 10. It is advantageously approximately equal to 1.

Figure 10:
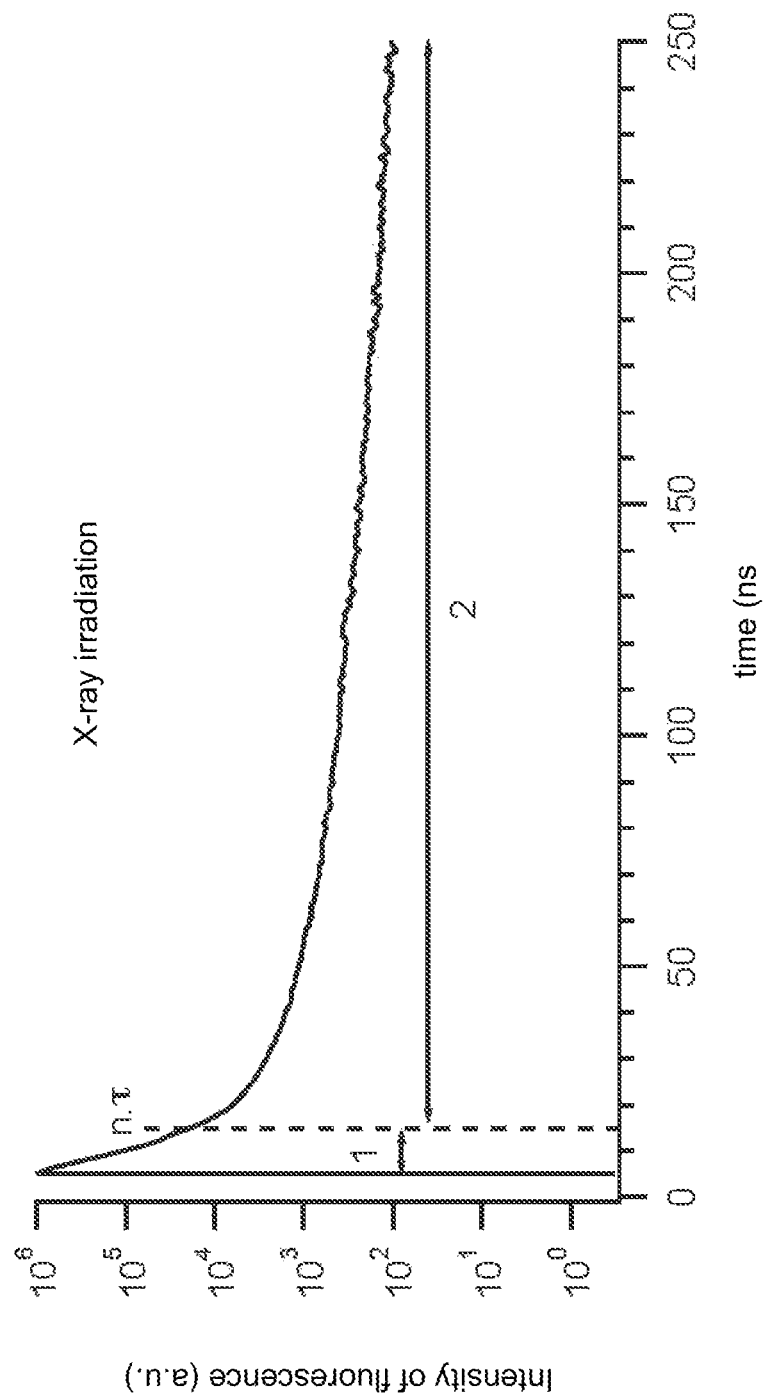
FIG. 10 is a graph representing the number of coincidence events detected by the determination device as a function of the detection time.

The detection time $n\times\tau$ has been illustrated on FIG. 10 in the form of a vertical line. This vertical line separates the coincidence events resulting from the excitation processes (on the left on FIG. 10) from the coincidence events resulting from the ionisation processes (on the right on FIG. 10).

The maximum detection time corresponds to the highest value of the detection time for which at least one coincidence event has been detected during the predetermined irradiation time.

The second predetermined proportionality factor is different from the predetermined proportionality factor as described above.

Like the predetermined proportionality factor described above, the second predetermined proportionality factor is for example stored in a memory of the analysis device 8'.

In particular, the second proportionality factor depends solely upon the characteristics of the acquisition device 7, the analysis device 8 and the scintillator 5', 5", that is to say the characteristics of the acquisition chain. It is independent of the distance of the scintillator 5', 5" from the source 2', 2".

The second proportionality factor is, for example, predetermined by irradiating the scintillator 5', 5" by means of a source of ionising radiation 2', 2" by:
    measuring the irradiation dose deposited in the scintillator 5', 5" using a reference dosimeter, for example an ionisation chamber, and by
    determining the total number of ionisation coincidence events detected in the same conditions using the device for determination of the dose according to the variant of the second or third embodiments of the invention.

The ratio between the irradiation dose measured by means of the reference device and the total number of ionisation coincidence events determined corresponds to the second predetermined proportionality factor.

This second proportionality factor is lower than the first proportionality factor.

In particular, the irradiation dose determined by the method according to the first, second or third embodiment described above is equal to the ionisation dose.

According to this variant, the calculation means 35', 35" are, optionally, configured in order to further determine the excitation dose deposited in the scintillator 5', 5" by the radiation, in particular ionising radiation, when the scintillator 5', 5" is irradiated during the predetermined irradiation time.

To this end, the calculation means 35' are configured in order to:
    calculate the integral of the curve representing the number of coincidence events detected as a function of the detection time, between a minimum detection time and a detection time $\Delta t$ equal to $n\times\tau$, and a maximum detection time in order to obtain a total number of excitation coincidence events; and in order to
    determine the excitation dose deposited in the scintillator 5', 5" by multiplying the total number of excitation coincidence events by a predetermined third proportionality factor.

The minimum detection time corresponds to the lowest value of the detection time for which at least one coincidence event has been detected during the predetermined irradiation time.

τ is the fluorescence lifetime of the scintillator 5', 5".

It will be noted that the constant n is such that, when the curve is integrated over the detection time interval between n×τ and the maximum detection time, only the coincidence events resulting from the excitations of the scintillator 5', 5" by the ionising radiation are added up.

The third predetermined proportionality factor is different from the predetermined proportionality factor described above. Like the other predetermined proportionality factors described above, the third predetermined proportionality factor is for example stored in a memory of the analysis device 8', 8".

In particular, it depends solely upon the characteristics of the acquisition device 7', 7" of the analysis device 8', 8" and the scintillator 5', 5", that is to say the characteristics of the acquisition chain. It is independent of the distance of the scintillator 5', 5".

In particular, the third predetermined proportionality factor is determined by calibration. This calibration is for example performed by measuring the dose deposited in the scintillator 5', 5" by means of a reference dosimeter and by considering that the sum of the ionisations and of the excitations corresponds to the total irradiation dose deposited in the scintillator. The total irradiation dose thus calculated is greater than the dose measured with the reference dosimeter. The third predetermined proportionality factor corresponds for example to the ratio between the ionisation dose and the number of ionisation coincidence events as determined previously.

The method of determination of the irradiation dose deposited in the scintillator according to a variant of the second or third embodiment comprises a step of determination of the ionisation dose deposited in the scintillator 5', 5".

This step comprises the sub-steps of:
  calculating the integral of the curve representing the number of coincidence events detected as a function of the detection time, between the detection time Δt equal to n×τ, and a maximum detection time in order to obtain the total number of ionisation coincidence events; and
  determining the ionisation dose deposited in the scintillator 5', 5" by multiplying this total number of ionisation coincidence events by the predetermined second proportionality factor.

Optionally, the method according to this variant also comprises a step of determination of the excitation dose deposited in the scintillator 5', 5", which step comprises the sub-steps of:
  calculating the integral of the curve representing the number of coincidence events detected as a function of the detection time, between the minimum detection time and the detection time Δt equal to n×τ in order to obtain the total number of excitation coincidence events; and
  determining the excitation dose deposited in the scintillator 5',5" by multiplying the total number of excitation coincidence events by the predetermined third proportionality factor.

The step of determination of the ionisation dose deposited in the scintillator 5', 5" and/or the step of determination of the excitation dose deposited in the scintillator 5', 5" can also be implemented independently of the method of the determination of the irradiation dose deposited in the scintillator 5', 5" as defined previously, by implementing only the steps of this method consisting of:
  irradiating the scintillator 5', 5" by means of the ionising radiation for a predetermined time, each interaction between the ionising radiation and the scintillator exciting the scintillator and giving rise to the emission of scintillation photons; and
  detecting the coincidence events and obtaining a curve of the coincidence events as a function of the detection time, then implementing the step of determination of the ionisation dose and/or the step of determination of the excitation dose, without determination of the irradiation dose deposited in the scintillator 5', 5".

The invention claimed is:

1. A method of determination of an irradiation dose deposited in a scintillator by ionising radiation, the method comprising:
  irradiating the scintillator with the ionising radiation for a predetermined time, each interaction between the ionising radiation and the scintillator exciting the scintillator and giving rise to an emission of scintillation photons;
  detecting a moment of excitation of the scintillator by the ionising radiation using a first photodetector, wherein the detection of the excitation moment of the scintillator comprises reception of at least one scintillation photon emitted by the scintillator; then
  detecting a moment of reception of a scintillation photon emitted by the scintillator using a second photodetector operating in single photon counting mode;
  identifying each sequence consisting of the detection of a moment of excitation by the first photodetector followed by the detection of a moment of reception by the second photodetector with a coincidence event;
  counting the number of coincidence events detected during the predetermined irradiation time; and
  obtaining the irradiation dose deposited in the scintillator during the predetermined irradiation time as a function of the number of coincidence events counted and of a predetermined proportionality factor.

2. The method of determination according to claim 1, wherein the second photodetector has a physical aperture for receiving photons which has a smaller area than a physical aperture for receiving photons of the first photodetector.

3. The method of determination according to claim 1, further comprising: measuring a detection time, which corresponds to a duration between the moment of excitation detected by the first photodetector and the moment of reception of a scintillation photon by the second photodetector for each coincidence event; constructing a curve of the number of coincidence events as a function of the detection time; and wherein the step of obtaining the irradiation dose deposited in the scintillator during the predetermined irradiation time is based on an integration of at least one part of the curve and on the predetermined proportionality factor.

4. The method of determination according to claim 1, wherein the predetermined proportionality factor is independent of the number of coincidence events detected.

5. The method of determination according to claim 1, further comprising transmitting at least a part of the light coming from the scintillator towards the first photodetector and the second photodetector with an optical fibre.

6. The method of determination according to claim 1, wherein the scintillator is in a compartment intended for the application of the ionising radiation to a living organism.

7. The method of determination according to claim 1, wherein the first photodetector and the second photodetector are independently selected from the group consisting of a photomultiplier tube, a photomultiplier with a microchannel plate, and a diode sensor.

8. The method of determination according to claim 1, wherein the scintillator is an organic scintillator.

9. The method of determination according to claim 1, wherein the moment of excitation detected using the first photodetector corresponds to a moment of detection by the first photodetector of a first scintillation photon emitted by the scintillator.

10. The method of determination according to claim 1, wherein the scintillation photon detected by the second photodetector is emitted by the scintillator during the excitation event corresponding to the moment of excitation detected by the first photodetector.

11. The method of determination according to claim 1, wherein the second photodetector does not function in single photon counting mode during the step of detecting the moment of reception of a scintillation photon by the second photodetector.

12. The method of determination according to claim 3, further comprising determining an ionisation dose deposited in the scintillator by:
calculating the integral of the curve of the number of coincidence events detected as a function of the detection time, between a detection time equal to $n \times \tau$ where n is a constant between 1 and 10 and $\tau$ is a fluorescence lifetime of the scintillator and a maximum detection time, to obtain a total number of ionisation coincidence events; and
multiplying the total number of ionisation coincidence events by a predetermined second proportionality factor, thereby determining the ionisation dose deposited in the scintillator.

13. The method of determination according to claim 3, further comprising determining an excitation dose deposited in the scintillator by:
calculating the integral of the curve of the number of coincidence events detected as a function of the detection time, between a minimum detection time and a detection time $\Delta\tau$ equal to $n \times \tau$, to obtain a total number of excitation coincidence events; and
multiplying the total number of excitation coincidence events by a predetermined third proportionality factor, thereby determining the excitation dose deposited in the scintillator.

14. A method of determination of a curve giving an irradiation dose absorbed by a scintillator as a function of the distance between the scintillator and a source of ionising radiation, the method comprising determining the irradiation dose deposited at different distances from the source by carrying out, at each of these distances, the method of determining the irradiation dose-deposited comprising:
irradiating the scintillator with the ionising radiation for a predetermined time, each interaction between the ionising radiation and the scintillator exciting the scintillator and giving rise to an emission of scintillation photons;
detecting a moment of excitation of the scintillator by the ionising radiation using a first photodetector, wherein the detection of the excitation moment of the scintillator comprises reception of at least one scintillation photon emitted by the scintillator; then
detecting a moment of reception of a scintillation photon emitted by the scintillator using a second photodetector operating in single photon counting mode;
identifying each sequence consisting of the detection of a moment of excitation by the first photodetector followed by the detection of a moment of reception by the second photodetector with a coincidence event;
counting the number of coincidence events detected during the predetermined irradiation time; and
obtaining the irradiation dose deposited in the scintillator at the considered distance from the source during the predetermined irradiation time as a function of the number of coincidence events counted and of a predetermined proportionality factor.

15. A device for the determination of the irradiation dose deposited in a scintillator by an ionising radiation emitted by a source for a predetermined time, the device comprising:
a scintillator configured to be irradiated by the ionising radiation and adapted to emit scintillation photons at each interaction with the ionising radiation;
a first photodetector configured to detect a moment of excitation of the scintillator, wherein the detection of the excitation moment of the scintillator comprises reception of at least one scintillation photon emitted by the scintillator, and a second photodetector configured to operate in single photon counting mode to detect a moment of reception of a scintillation photon emitted by the scintillator;
an identification means configured to identify each sequence consisting of the detection of the moment of excitation by the first photodetector followed by the detection of the moment of reception of the scintillation photon by the second photodetector with a coincidence event;
a counting means configured to count the number of coincidence events detected during the predetermined irradiation time; and
a calculation means configured to obtain the irradiation dose deposited in the scintillator during the predetermined irradiation time as a function of the number of coincidence events and of a predetermined proportionality factor.

16. The device according to claim 15, wherein the scintillator is integral with at least one optical fibre, which is adapted to transmit the scintillation photons emitted by the scintillator towards the first photodetector and the second photodetector.

17. The device according to claim 15, wherein:
the identification means further configured to measure a detection time, which corresponds to a duration between the moment of excitation detected by the first photodetector and the moment of reception of a scintillation photon by the second photodetector for each coincidence event; and
the calculation means is further configured to construct a curve of the number of coincidence events as a function of the detection time.

18. The device according to claim 17, wherein the calculation means is further configured to:
calculate the integral of the curve of the number of coincidence events detected as a function of the detection time, between a detection time equal to $n \times \tau$ where n is a constant between 1 and 10 and $\tau$ is a fluorescence lifetime of the scintillator and a maximum detection time, to obtain a total number of ionisation coincidence events; and
determine an ionisation dose deposited in the scintillator by multiplying the total number of ionisation coincidence events by a predetermined second proportionality factor.

19. The device according to claim 17, wherein the calculation means is further configured to:
calculate the integral of the curve of the number of coincidence events detected as a function of the detection time, between a minimum detection time and a detection time $\Delta\tau$ equal to $n\times\tau$, to obtain a total number of excitation coincidence events; and determine an excitation dose deposited in the scintillator by multiplying the total number of excitation coincidence events by a predetermined third proportionality factor.

\* \* \* \* \*